US010177632B2

(12) United States Patent
Miyajima

(10) Patent No.: US 10,177,632 B2
(45) Date of Patent: Jan. 8, 2019

(54) BRUSHLESS MOTOR

(71) Applicant: MABUCHI MOTOR CO., LTD., Matsudo, Chiba (JP)

(72) Inventor: Yusuke Miyajima, Matsudo (JP)

(73) Assignee: MABUCHI MOTOR CO., LTD., Matsudo, Chiba (JP)

(*) Notice: Subject to any disclaimer, the term of this patent is extended or adjusted under 35 U.S.C. 154(b) by 116 days.

(21) Appl. No.: 14/683,874

(22) Filed: Apr. 10, 2015

(65) Prior Publication Data
US 2015/0295476 A1 Oct. 15, 2015

(30) Foreign Application Priority Data
Apr. 11, 2014 (JP) .................... 2014-082292

(51) Int. Cl.
*H02K 29/08* (2006.01)
*H02K 5/15* (2006.01)
(Continued)

(52) U.S. Cl.
CPC ......... *H02K 11/0021* (2013.01); *H02K 3/522* (2013.01); *H02K 5/15* (2013.01);
(Continued)

(58) Field of Classification Search
CPC ........ H02K 1/27; H02K 1/2753; H02K 1/276; H02K 11/00; H02K 11/21; H02K 11/215;
(Continued)

(56) References Cited

U.S. PATENT DOCUMENTS 5,410,202 A * 4/1995 Roger .................... H02K 5/225
242/432
5,864,192 A * 1/1999 Nagate .................. H02K 29/08
310/156.05
(Continued)

FOREIGN PATENT DOCUMENTS

CN 1178037 A 4/1998
CN 1296324 A 5/2001
(Continued)

OTHER PUBLICATIONS

Office Action in Chinese Patent Application No. 2015101699179, dated Jul. 28, 2017; 14 pages including English translation.
(Continued)

*Primary Examiner* — Joshua Benitez Rosario
*Assistant Examiner* — Alexander Moraza
(74) *Attorney, Agent, or Firm* — Schwabe Williamson & Wyatt, PC

(57) ABSTRACT

A brushless motor includes: a columnar rotor including magnets; a stator including at its center a space for placing the rotor; a housing member that houses the rotor and the stator; and a detector that detects a signal dependent on a rotational position of the rotor based on variation in a magnetic field associated with a rotation of the rotor.

The housing member includes a front bell that supports a portion of the rotating shaft of the rotor and a housing body that supports another portion of the rotating shaft of the rotor. The front bell includes a mount fitted with the detector. The mount projects from the base toward an end face of the rotor.

8 Claims, 7 Drawing Sheets

(51) Int. Cl.
*H02K 11/215* (2016.01)
*H02K 1/27* (2006.01)
*H02K 3/52* (2006.01)
*H02K 11/00* (2016.01)
*H02K 5/173* (2006.01)
*H02K 5/22* (2006.01)
*H02K 5/16* (2006.01)

(52) U.S. Cl.
CPC .............. *H02K 5/1732* (2013.01); *H02K 5/22* (2013.01); *H02K 11/215* (2016.01); *H02K 1/27* (2013.01); *H02K 5/161* (2013.01); *H02K 29/08* (2013.01); *H02K 2213/03* (2013.01)

(58) Field of Classification Search
CPC .... H02K 2211/03; H02K 29/06; H02K 29/08; H02K 3/522; H02K 5/00; H02K 5/04; H02K 5/15; H02K 5/22; H02K 5/1732; H02K 3/52; H02K 3/521; H02K 3/50; H02K 5/16; H02K 5/161; H02K 5/1672
USPC .... 310/68 B, 156.53, 156.56, 400, 406, 407, 310/410, 89, 91, 401, 418, 425, 194, 208
See application file for complete search history.

(56) References Cited

U.S. PATENT DOCUMENTS

| | | | | |
|---|---|---|---|---|
| 5,952,751 A * | 9/1999 | Yamakoshi | ............. | H02K 5/04 29/596 |
| 6,025,665 A * | 2/2000 | Poag | ..................... | H02K 1/278 310/68 B |
| 6,037,726 A * | 3/2000 | Tabata | ................. | B60K 7/0007 180/65.8 |
| 6,429,566 B1 * | 8/2002 | Kuwahara | ............ | H02K 1/2773 310/156.56 |
| 2004/0007935 A1 * | 1/2004 | Kimura | .................. | H02K 3/522 310/71 |
| 2004/0183386 A1 * | 9/2004 | Kuwert | ..................... | H02K 3/50 310/89 |
| 2007/0278876 A1 * | 12/2007 | Haga | ...................... | H02K 3/522 310/71 |
| 2012/0126646 A1 | 5/2012 | Nakagawa | | |

FOREIGN PATENT DOCUMENTS

| | | |
|---|---|---|
| CN | 101355283 A | 1/2009 |
| JP | 2002101583 A | 4/2002 |
| JP | 3306870 B2 | 7/2002 |
| JP | 2005-057855 A | 3/2005 |
| JP | 2007-325482 A | 12/2007 |
| WO | 94/1920 | 1/1994 |

OTHER PUBLICATIONS

Office Action in Japanese Patent Application No. 2014-082292, dated Jul. 25, 2017; 7 pages including English translation.
Hanselman, Duane C., "Brushless Permanent Magnet Motor Design", Second Edition, Lebanon, Ohio, US: Magna Physics Publishing, 2012; pp. 117-120; ISBN 1-881855-15-5.
Office Action issued for German Application No. 102015105475.2 dated Nov. 21, 2017; 9 pages (including English translation).

* cited by examiner

BRUSHLESS MOTOR

CROSS-REFERENCE TO RELATED APPLICATIONS

This application is based upon and claims the benefit of priority from the prior Japanese Patent Application No. 2014-082292, filed on Apr. 11, 2014, the entire content of which is incorporated herein by reference.

BACKGROUND OF THE INVENTION

1. Field of the Invention

The present invention relates to a brushless motor.

2. Description of the Related Art

In the conventional practice, motors are used as driving sources of various types of apparatuses and products. For example, the motors are used for business machines, such as printers and copying machines, various kinds of home electric appliances, and power assist sources of vehicles, such as automobiles and power-assisted bicycles. In particular, brushless motors are sometimes used as the driving sources of movable parts with high operation frequency in the light of increased durability and reduced noise.

A brushless motor is capable of rotating a rotor by controlling conduction of an electric to a stator coil. A brushless motor lacks a brush or a commutator so that it is necessary to detect the rotational position of the rotor in some way. Typically, Hall elements or Hall IC's are used as means for detection.

Various ideas of arrangement of means for detection have been proposed depending on the rotor and stator configuration. For example, there are motors in which a substrate carrying a position detection element is provided opposite to the axial end face of the rotor (see patent document 1).

[patent document 1] JP2002-101583

In the motors described above, a portion of the rotor magnet is caused to overhang from the rotor end face to maintain the distance between the rotor magnet and the position detection element, for the purpose of increasing the magnetic flux necessary for detection of the position. However, this results in a larger axial length (thickness) of the motor. Further, the use of the magnet defining the overhang that does not contribute to the motor performance increases the cost.

SUMMARY OF THE INVENTION

The embodiments of the present invention address the issue and a purpose thereof is to provide a technology capable of achieving a brushless motor in which the size is reduced at a low cost.

The brushless motor according to an embodiment of the present invention includes: a columnar rotor including magnets; a stator including at its center a space for placing the rotor; a housing member that houses the rotor and the stator; and a detector that detects a signal dependent on a rotational position of the rotor based on variation in a magnetic field associated with a rotation of the rotor. The housing member includes: a first support member that supports a portion of a rotating shaft of the rotor; and a second support member that supports another portion of the rotating shaft of the rotor. The first support member includes: a base; a support formed at a center of the base to support the rotating shaft; and a mount formed around the support and fitted with the detector. The mount projects from the base toward an end face of the rotor.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1:
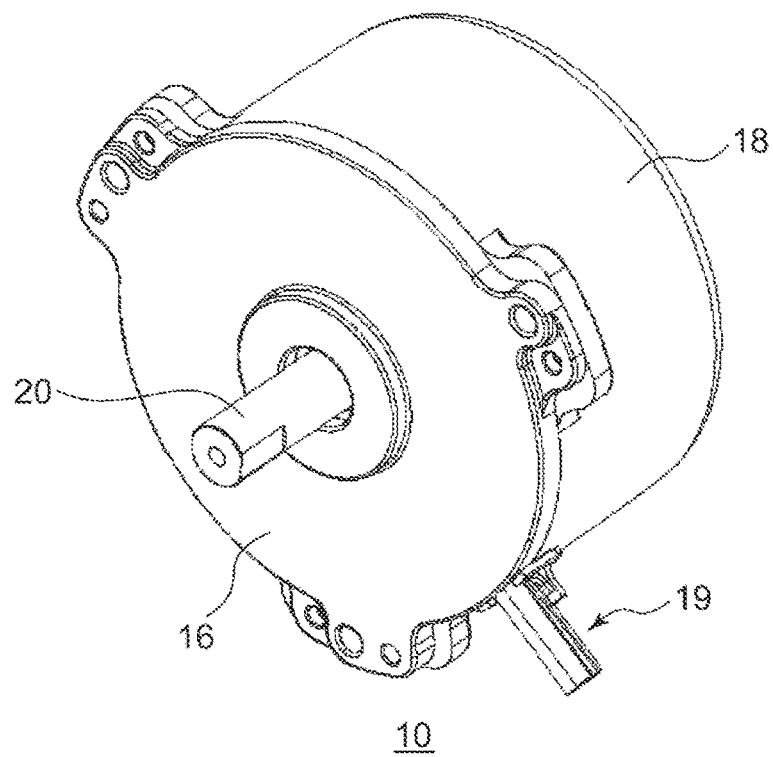
FIG. 1 is an overall perspective view of a brushless motor according to an embodiment of the present invention.

The invention will now be described by reference to the preferred embodiments. This does not intend to limit the scope of the present invention, but to exemplify the invention.

The brushless motor according to an embodiment of the present invention includes a columnar rotor including magnets, a stator including at its center a space for placing the rotor, a housing member that houses the rotor and the stator, and a detector that detects a signal dependent on the rotational position of the rotor based on variation in the magnetic field associated with the rotation of the rotor. The housing member includes a first support member (such as front bell 16) that supports a portion of the rotating shaft of the rotor and a second support member (such as housing body 18) that supports another portion of the rotating shaft of the rotor. The first support member includes: a base; a support formed at a center of the base to support the rotating shaft; and a mount formed around the support and fitted with the detector. The mount projects from the base toward an end face of the rotor.

Since the detector is mounted on the projecting mount according to the embodiment, the detector is placed nearer the end face of the rotor than otherwise. This improves the precision with which the detector detects a signal and reduces the thickness of the brushless motor in the direction of the shaft.

The stator may include a stator winding wound around an insulator. An end of the stator winding facing the first support member may protrude beyond the end face of the rotor, and the mount may include a projecting end face at a position facing the rotor. The projecting end face may be located between a winding end of the stator winding and the end face of the rotor in a direction of the rotating shaft. This allows the mount to approximate the rotor end face without causing interference between the first support member and the stator winding.

The brushless motor may further include a lead that supplies electricity to the detector or the stator winding from outside the housing member. The mount may be configured such that a gap between the projecting end face and the insulator is smaller than an outer diameter of the lead. This prevents the lead from entering a region in the vicinity of the rotor end face to interfere with the rotor.

The support and the mount may have a continuous flat surface. This improves the strength in the vicinity of the support. The flat surface makes it easy to position and mount the detector. The flat surface can be used to support an ejector pin.

The support may be formed with a circular recess or a through hole for housing a bearing for rotatably supporting the rotating shaft. In this way, the first support member can be implemented by a single component so as to include a plurality of functions embodied by the support and the mount, for which positional precision and dimensional precision are required.

The rotor may include: a circular rotor core; and a plurality of plate-shaped magnets. The rotor core may include a plurality of magnet holders radially formed around the rotating shaft. The plate-shaped magnets may be housed in the magnet holders such that the same magnetic poles of adjacent magnets face each other in a circumferential direction of the rotor core. This improves the average magnetic flux density at the outer circumference of the rotor.

Optional combinations of the aforementioned constituting elements, and implementations of the invention in the form of components, manufacturing methods, and systems may also be practiced as additional modes of the present invention. According to the embodiment described above, the precision with which the detector detects a signal is improved, while reducing the cost at the same time. The embodiment also reduces the thickness of the motor in the direction of rotating shaft.

A description will now be given of the embodiment of the present invention with reference to the drawings. Like numerals represent like elements so that the description will be omitted accordingly. The structures described below are by way of examples only and do not limit the scope of the present invention. A brushless motor of inner rotor type is described below by way of an example.

(Brushless Motor)

Figure 2:
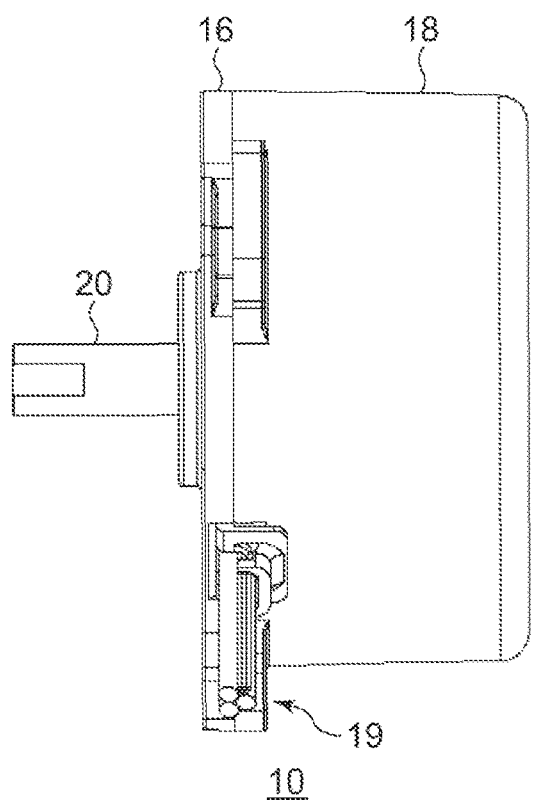
FIG. 2 is a lateral view of the brushless motor according to the embodiment.
Figure 3:
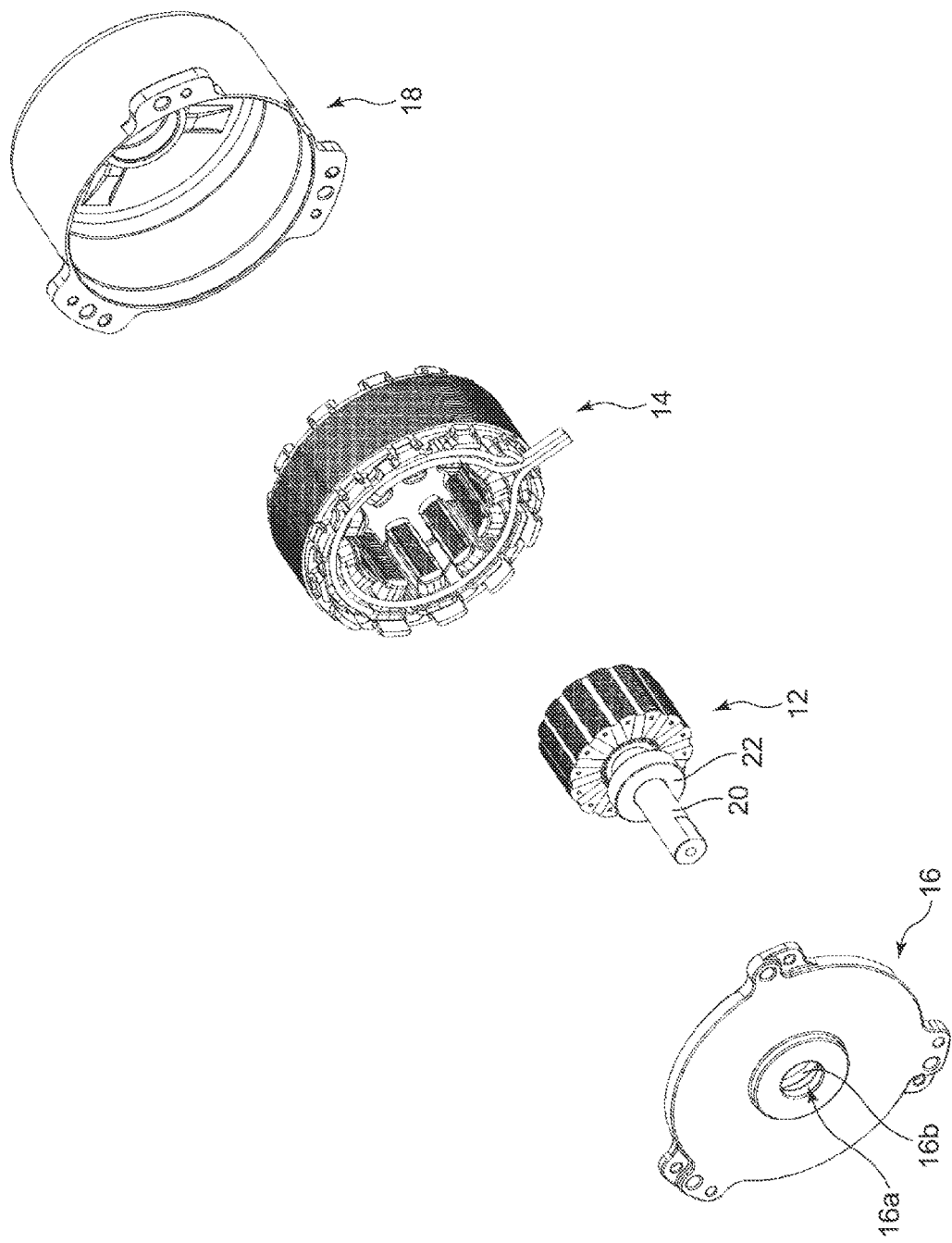
FIG. 3 is an exploded perspective view of the brushless motor according to the embodiment.
Figure 4:
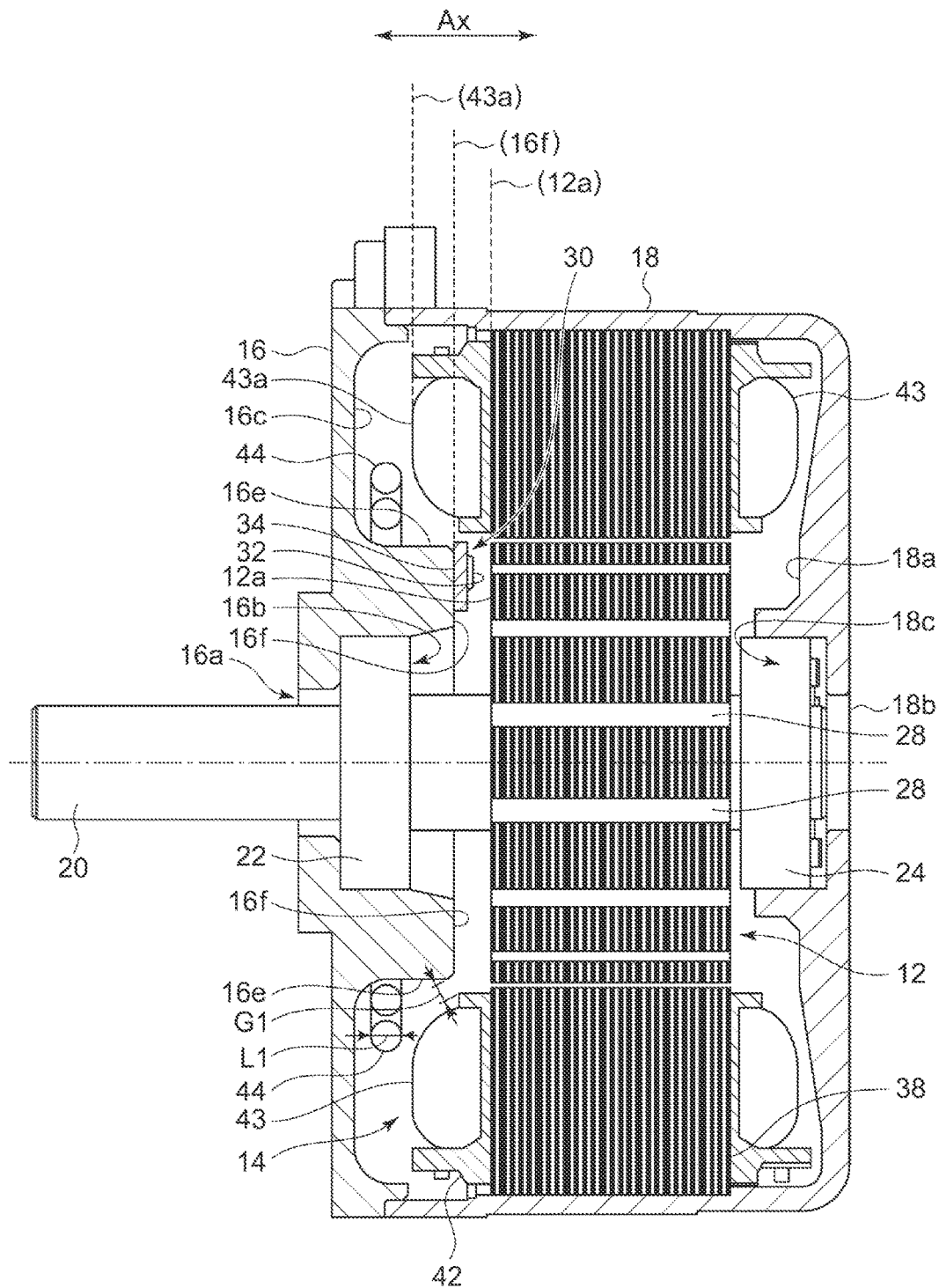
FIG. 4 is a lateral cross-sectional view of the brushless motor according to the embodiment.

FIG. 1 is an overall perspective view of a brushless motor according to an embodiment of the present invention. FIG. 2 is a lateral view of the brushless motor according to the embodiment. FIG. 3 is an exploded perspective view of the brushless motor according to the embodiment. FIG. 4 is a lateral cross-sectional view of the brushless motor according to the embodiment.

The brushless motor (hereinafter, sometimes referred to as "motor") 10 according to the embodiment includes a columnar rotor 12 including magnets, a stator 14 including at its center a space for placing the rotor 12, a front bell 16, a housing body 18, and a power feeder 19.

The front bell 16, which is a plate-shaped member, has a hole 16a formed in a central part so that a rotating shaft 20 can penetrate therethrough, and is formed with a recess 16b near the hole 16a to hold a bearing 22. The front bell 16 supports a portion of the rotating shaft 20 of the rotor 12 via the bearing 22, and thus may be referred to herein as a first support member. The housing body 18 is a cylindrical member. A hole 18b is formed at the center of a base 18a, and a recess 18c for supporting a bearing 24 is formed near the hole 18b. The housing body 18 supports the other portion of the rotating shaft 20 of the rotor 12 via the bearing 24, and thus may be referred to herein as a second support member. The front bell 16 and the housing body 18 constitute a housing member for housing the rotor 12 and the stator 14.

(Rotor)

Figure 5A:
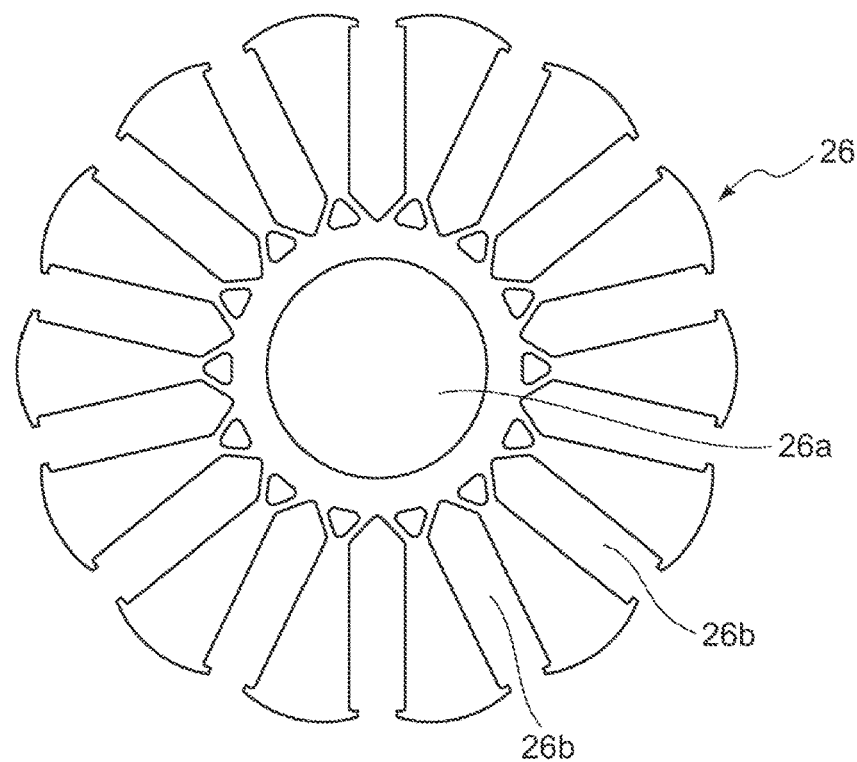
FIG. 5A is a top view of the rotor core according to the embodiment.
Figure 5B:
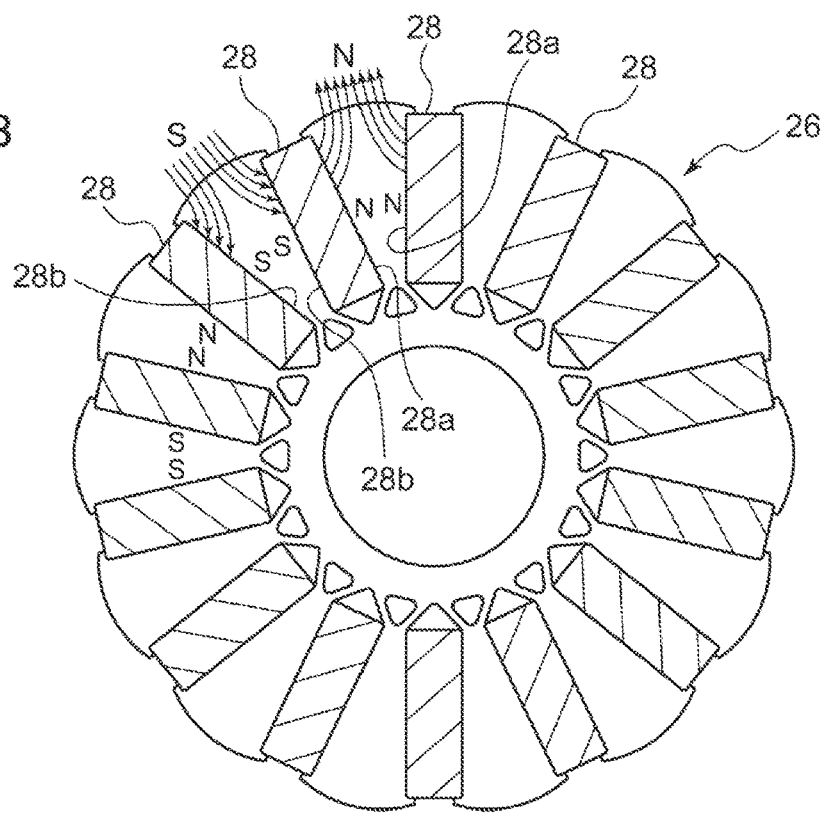
FIG. 5B is a top view showing a state where the magnet is fitted into the rotor core shown in FIG. 5A.

FIG. 5A is a top view of the rotor core according to the embodiment, and FIG. 5B is a top view showing a state where the magnet is fitted into the rotor core shown in FIG. 5A.

The rotor 12 is comprised of a circular rotor core 26 and a plurality of magnets 28. A through-hole 26a, which is fixed with the rotating shaft 20 inserted thereinto, is formed in the center of the rotor core 26. Also, the rotor core 26 includes a plurality of magnet holders 26b that are fixed by inserting the magnets 28 thereinto. The magnets 28 are members of a plate shape conforming to the shape of the magnet holders 26b.

The members described above are assembled in sequence. More specifically, a plurality (i.e., fourteen) of magnets 28 are fitted into the corresponding magnet holders 26b, and the rotating shaft 20 is inserted into the through-hole 26a of the rotor core 26. Then the bearing 22 and 24 are mounted to the rotating shaft 20.

(Rotor Core)

In the rotor core 26 shown in FIG. 5A, a plurality of plate-shaped members are laminated. Each of the plurality of plate-shaped members is manufactured such that a non-oriented electromagnetic steel sheet (e.g., silicon steel sheet) is stamped out into a predetermined shape, as shown in FIG. 5A, by press-forming. Then the magnet holders 26b are radially formed around the rotating shaft of the rotor core 26.

As shown in FIG. 5B, the magnets 28 are housed in the magnet holders 26b such that the same magnetic poles of adjacent magnets face each other in the circumferential direction of the rotor core 26. In other words, the magnets 28 are configured such that principal surfaces 28a and 28b, whose surface areas are largest among the six surfaces of each of the adjacent magnets 28 that are approximately rectangular parallelepipeds, are an N-pole and an S-pole, respectively. Thus, the lines of magnetic force emanating from the principal surface 28a of the magnet 28 are directed outward of the rotor core 26 from a region disposed between these two adjacent magnets 28. As a result, the rotor 12 according to the present embodiment functions as fourteen magnets such that seven N-poles and seven S-poles are alternately formed in a circumferential direction of an outer circumferential surface of the rotor core 26.

The magnet 28 is a bonded magnet, a sintered magnet or the like, for instance. The bonded magnet is a magnet formed such that a magnetic material is kneaded with a rubber or resin material and then the resulting material undergoes injection molding or compression molding. Where the bonded magnet is used, a high-precision C face (inclined plane) or R face is obtained without having to undergo any postprocessing. On the other hand, the sintered magnet is a magnet formed such that powered magnetic materials are sintered at high temperature. The sintered magnet is more likely to improve the residual magnetic flux density than the bonded magnet is. However, in order to have a high-precision C face or R face, the postprocessing is often required.

(Stator)

Figure 6:
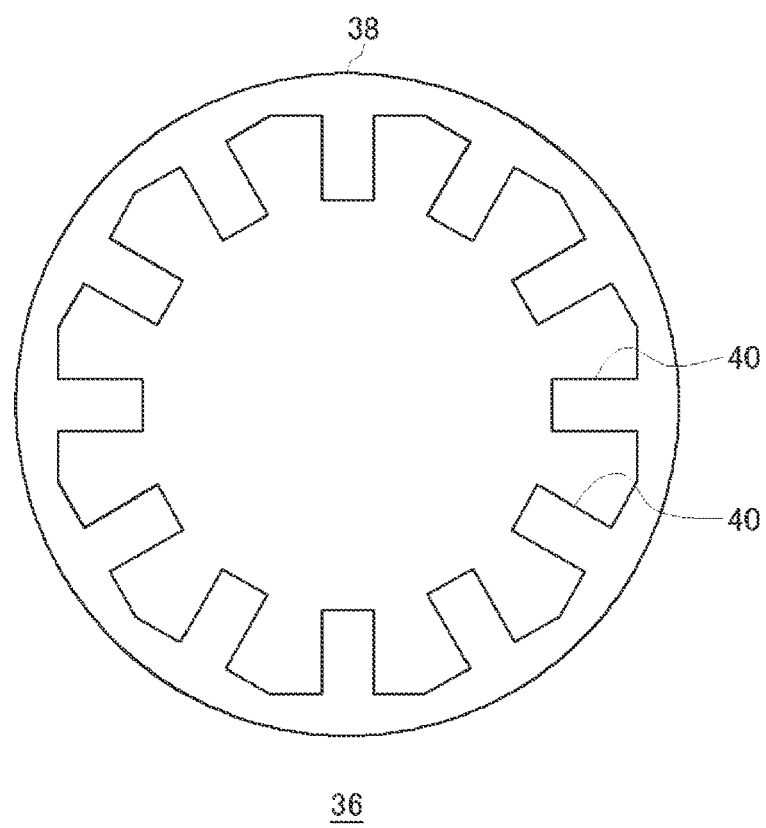
FIG. 6 is a top view of a stator core.
Figure 7:
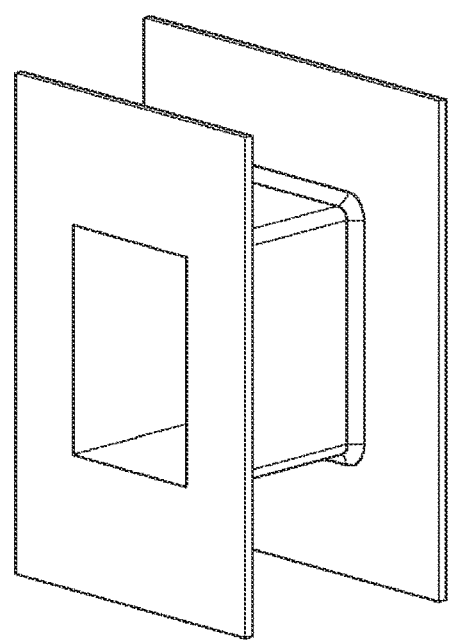
FIG. 7 is a perspective view of an insulator around which a winding is wound.

A structure of the stator 14 is now described. FIG. 6 is a top view of a stator core. FIG. 7 is a perspective view of an insulator around which a winding is wound.

A stator core 36 is a cylindrical member in which a plurality of plate-shaped stator yokes 38 are laminated. The stator yoke 38 is configured such that a plurality (e.g., twelve in the present embodiment) of teeth 40 are formed from an inner circumference of an annular portion toward the center.

An integrated-type insulator 42 as shown in FIG. 7 is attached to each of the teeth 40. Then, a conductor is wound around the insulator 42 for each of the teeth 40 so as to form a stator winding 43 (see FIG. 4). Then, the rotor 12 is placed in a central part of the stator 14 that has been completed through the above processes. If the teeth 40 are configured such that, if the width of the teeth 40 gets wider toward the tip thereof, a plurality of divided insulators may be attached from top and bottom of the teeth 40.

(Front Bell)

Figure 8:
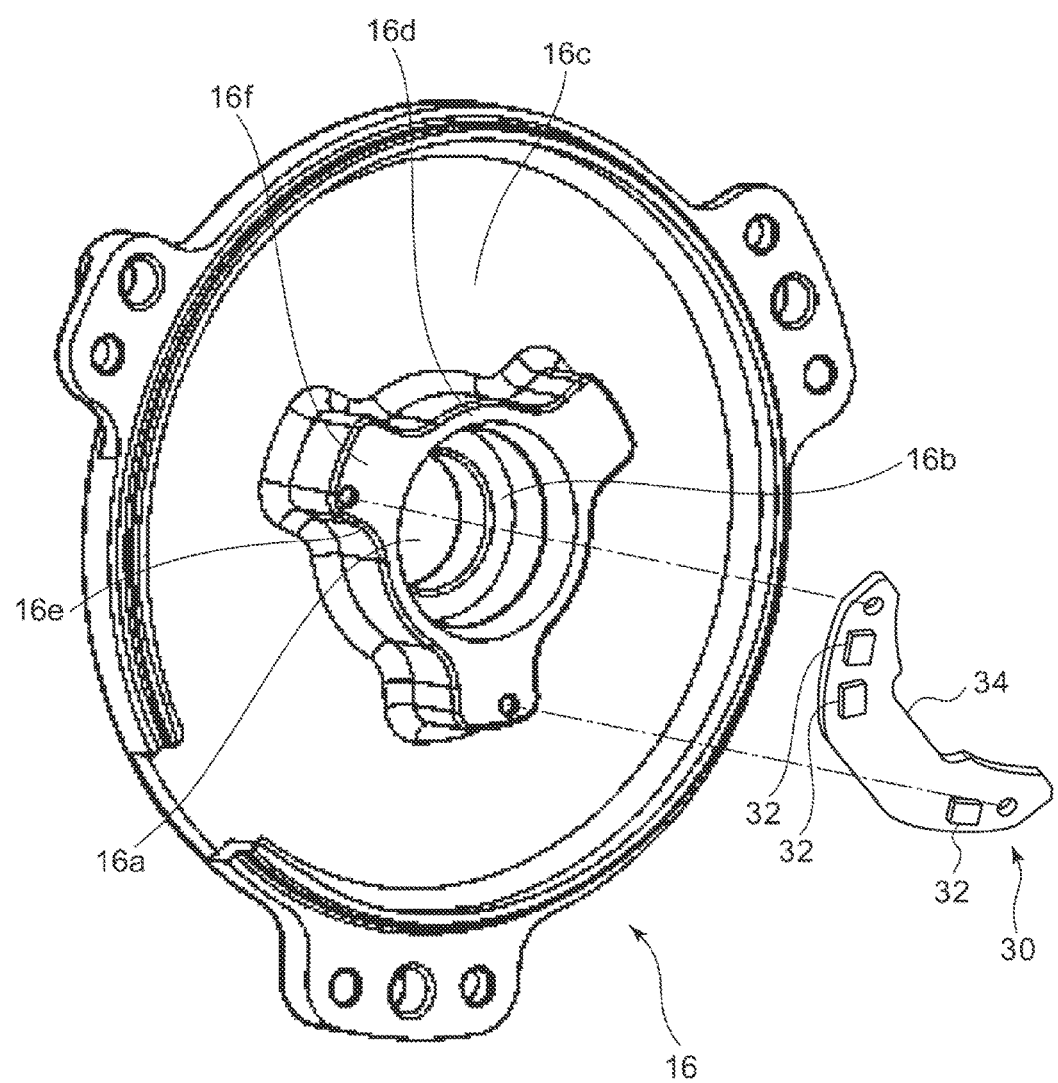
FIG. 8 is an exploded perspective view showing the front bell and how the detector is mounted according to the embodiment.
Figure 9:
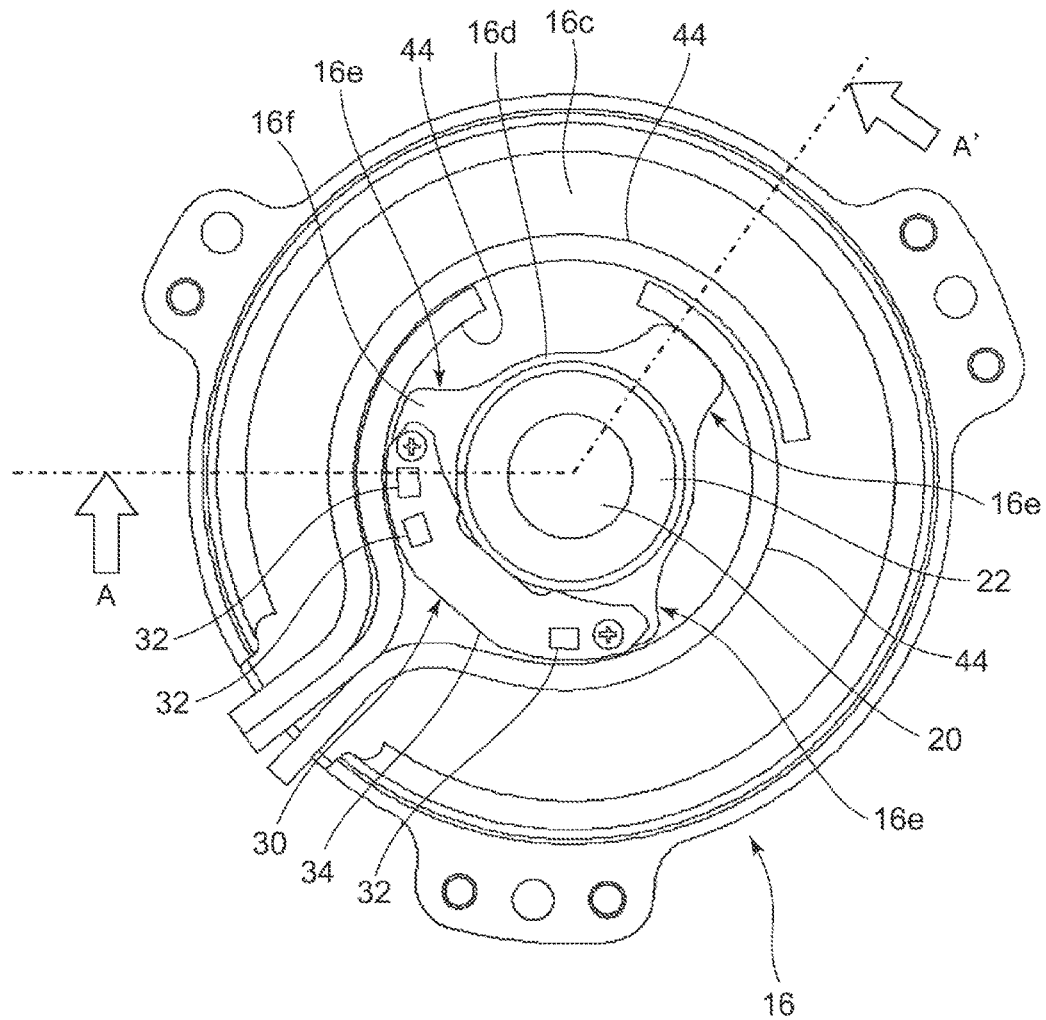
FIG. 9 is a front view of the detector mounted to the front bell according to the embodiment seen from inside the motor.

A detailed description will now be given of the front bell and the detector mounted on the front bell. FIG. 8 is an exploded perspective view showing the front bell and how the detector is mounted according to the embodiment. FIG. 9 is a front view of the detector mounted to the front bell seen from inside the motor according to the embodiment. The cross sectional view of FIG. 4 includes a cross section A-A of FIG. 9.

A detector 30 shown in FIG. 8 detects a signal dependent on the rotational position of the rotor 12 based on the variation in the magnetic field associated with the rotation of the rotor 12. More specifically, the detector 30 is implemented by mounting a detection element 32 such as a Hall element and a Hall IC on a substrate 34. The detector 30 according to the embodiment is provided with three detection elements 32.

The front bell 16 includes a base 16c, a support 16d formed at the center of the base 16c and supporting the rotating shaft 20 via the bearing 22, and a mount 16e integrally formed around the support 16d and fitted with the detector 30. As shown in FIG. 4, the mount 16e projects from the base 16c toward an end face 12a of the rotor 12 as far as a position that does not interfere with the stator winding 43.

Since the detector 30 of the motor 10 according to the embodiment is mounted on the projecting mount 16e, the detector 30 is placed near the end face 12a of the rotor 12. This improves the precision with which the detector 30 detects a signal and reduces the thickness of the motor 10 in the direction of rotating shaft.

As described above, the stator 14 includes the stator winding 43 wound around the insulator 42.

As shown in FIG. 4, a winding end 43a of the stator winding 43 facing the front bell 16 protrudes beyond the end face 12a of the rotor. The mount 16e includes a projecting end face 16f at a position facing the end face 12a of the rotor 12. The projecting end face 16f is located between the winding end 43a of the stator winding 43 and the end face 12a of the rotor 12 in the axial direction Ax of the rotating shaft 20. This allows the mount 16e to approximate the end face 12a of the rotor 12 without causing interference between the front bell 16 and the stator winding 43.

As shown in FIG. 4, the motor 10 is further provided with a lead 44 that supplies electricity to the detector 30 or the stator winding 43 from outside the housing member. The mount 16e is provided with a portion configured such that the gap G1 between the projecting end face 16f and the insulator 42 is smaller than the outer diameter L1 of the lead 44. This prevents the lead 44 from entering a region in the vicinity of the end face 12a of the rotor 12 to interfere with the rotor 12. The mount 16e may not be formed over the entire circumference of the support 16d. Owing to the rigidity and resiliency of the lead 44 itself, provision of the mount 16e at least in several portions (three portions in the case of the embodiment) is sufficient to prevent the lead 44 from entering the region in the vicinity of the end face 12a of the rotor 12 even where the mount 16e is not provided.

Further, as shown in FIGS. 8 and 9, the support 16d and the mount 16e have a continuous flat surface and are formed as one piece. This improves the strength in the vicinity of the support 16d. The flat surface also makes it easy to position and mount the detector 30. By, for example, casting the front bell 16 as one piece, the flat surface of the mount 16e can be used to support an ejector pin due to its rigidity.

As described above, the support 16d is formed with a circular recess 16b (through hole) for housing the bearing 22 for rotatably supporting the rotating shaft 20. In this way, the front bell 16 can be implemented by a single component so as to include a plurality of functions embodied by the support 16d and the mount 16e, for which positional precision and dimensional precision are required. The front bell 16 may have a shape that can be manufactured as one piece.

As described above, the component of the motor 10 according to the embodiment on which the detector is mounted is so shaped as to eliminate the need to overhang the magnet for the purpose of detecting the rotor position. Accordingly, the cost is reduced and the size of the motor is reduced due to the saved space. Further, since the rotor 12 and the detector 30 of the motor 10 approximate each other closely, desired precision of detecting the rotational position of the rotor can be obtained without elaborately designing the shape or arrangement of the magnets provided in the rotor.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

For example, the detector 30 is described above as being provided in the front bell 16 but the detector 30 can alternatively be provided in the housing body 18.

What is claimed is:

1. A brushless motor comprising:
   a columnar rotor including magnets;
   a stator including at its center a space for placing the rotor;
   a housing member that houses the rotor and the stator; and
   a detector that detects a signal dependent on a rotational position of the rotor based on variation in a magnetic field associated with a rotation of the rotor, wherein
   the housing member includes:
   a first support member that supports a portion of a rotating shaft of the rotor; and
   a second support member that supports another portion of the rotating shaft of the rotor, wherein
   the first support member includes:
   a base;
   a support formed at a center of the base to support the rotating shaft; and
   a mount formed around the support and fitted with the detector, and wherein
   the mount projects from the base toward an end face of the rotor,
   the stator includes a stator winding wound around an insulator,
   an end of the stator winding facing the first support member protrudes beyond the end face of the rotor, and
   the detector is located between a winding end of the stator winding and the end face of the rotor in a direction of the rotating shaft;

the brushless motor further comprising:
a lead that supplies electricity to the stator winding from outside the housing member, wherein
the mount and the insulator are spaced apart from each other in a radial direction,
the mount is provided with a portion configured such that a radial gap between the end face facing the rotor and the insulator is smaller than an outer diameter of the lead, and
the lead faces the stator winding in an axial direction and faces the support in a radial direction, and the lead is arranged to extend in a deflected state in a circumferential direction in a region radially outside the mount and between the base and the stator.

2. The brushless motor according to claim 1, wherein the support and the mount have a continuous flat surface.

3. The brushless motor according to claim 1, wherein the support is formed with a circular recess or a through hole for housing a bearing for rotatably supporting the rotating shaft.

4. The brushless motor according to claim 2, wherein the support is formed with a circular recess or a through hole for housing a bearing for rotatably supporting the rotating shaft.

5. The brushless motor according to claim 1, wherein the rotor includes:
a circular rotor core; and
a plurality of plate-shaped magnets, wherein
the rotor core includes a plurality of magnet holders radially formed around the rotating shaft, and
the plate-shaped magnets are housed in the magnet holders such that the same magnetic poles of adjacent magnets face each other in a circumferential direction of the rotor core.

6. The brushless motor according to claim 2, wherein the rotor includes:
a circular rotor core; and
a plurality of plate-shaped magnets, wherein
the rotor core includes a plurality of magnet holders radially formed around the rotating shaft, and
the plate-shaped magnets are housed in the magnet holders such that the same magnetic poles of adjacent magnets face each other in a circumferential direction of the rotor core.

7. The brushless motor according to claim 1, wherein
the support is formed to be annular,
a plurality of mounts are formed to extend in a radial direction from the support, and
the plurality of mounts are mutually spaced apart in a circumferential direction.

8. The brushless motor according to claim 7, wherein the detector has a substrate mounted over the plurality of mounts.

* * * * *